UNITED STATES PATENT OFFICE.

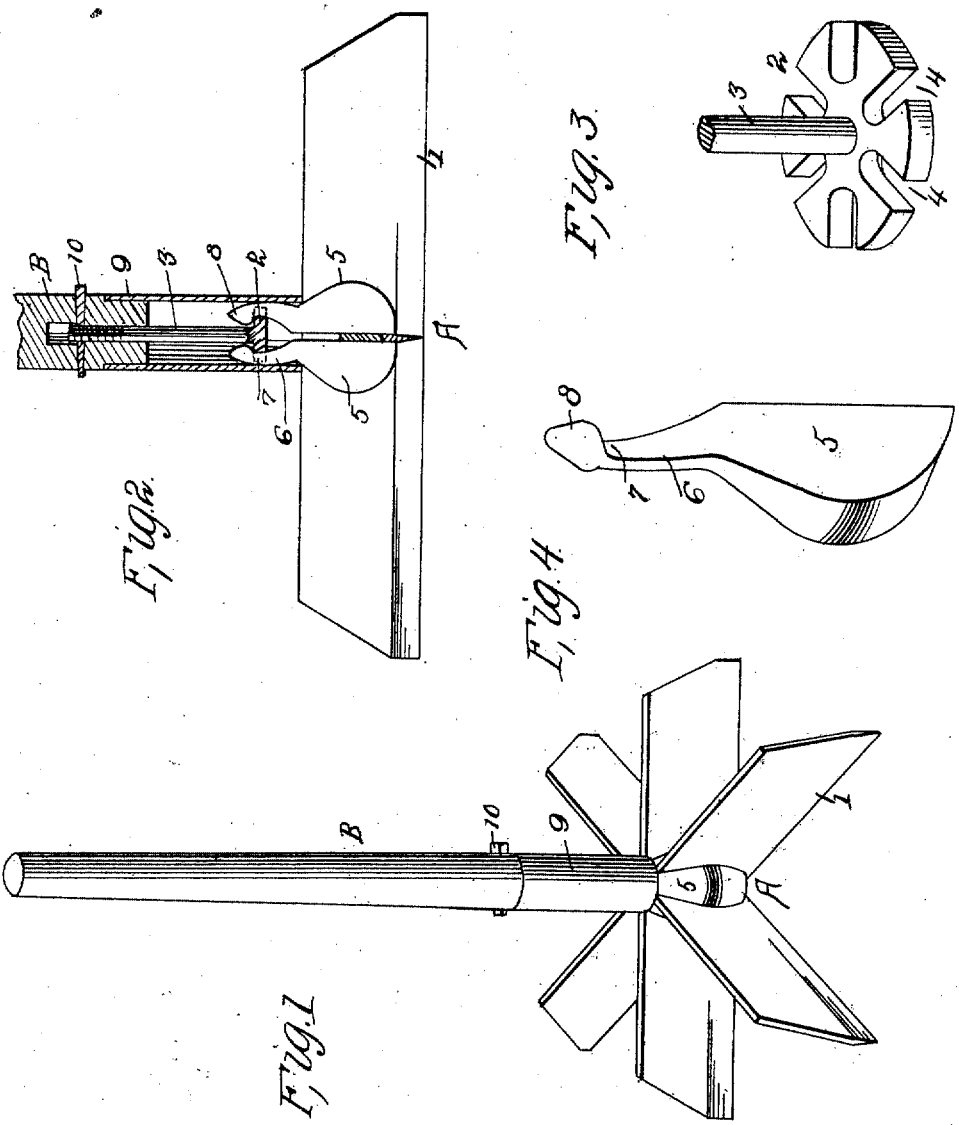

EDWARD L. ZAHN, OF HAMBLETON, WEST VIRGINIA.

CHOPPER.

983,969.  Specification of Letters Patent.  Patented Feb. 14, 1911.

Application filed May 21, 1910. Serial No. 562,609.

*To all whom it may concern:*

Be it known that I, EDWARD L. ZAHN, a citizen of the United States, residing at Hambleton, in the county of Tucker and State of West Virginia, have invented new and useful Improvements in Choppers, of which the following is a specification.

The present invention provides an implement designed most especially for comminuting meats, vegetables and fruit and which implement is of such construction as to admit of the parts being readily separated for cleaning, replacement or sharpening of the knives or cutting blades.

The invention consists of the novel features, details of construction and combination of parts, which hereinafter will be more particularly set forth, illustrated in the accompanying drawing, and pointed out in the appended claims.

Referring to the drawing, forming a part of the application, Figure 1 is a perspective view of a chopper embodying the invention. Fig. 2 is a vertical section of the cutter head and a portion of the handle. Fig. 3 is a perspective view of the clamp hub and a portion of the stem. Fig. 4 is a perspective view of one of the members of the clamp.

Corresponding and like parts are referred to in the following description, and indicated in all the views of the drawing, by the same reference characters.

The implement comprises a cutter head A and a handle B. The cutter head consists of a series of blades 1 and a clamp. The blades 1 are provided intermediate of their ends with slots of such relative lengths as to admit of the blades crossing at the center when assembled. The clamp comprises a series of jaws or members having loose connection with a hub 2, the latter being attached to the lower end of a stem 3. The hub 2 is formed in its edge with a series of notches 4, which receive the shanks of the clamp members or jaws. Each jaw or clamp member consists of a body 5 and a shank 6. The shank is reduced near its upper end to form a neck 7, which is surmounted by a head 8, the latter being of tapered form and adapted to engage over the upper side of the hub 2. The necks 7 of the several clamp members enter the notches 4 of the hub 2. The upper ends of the shanks 6 are deflected outwardly, thereby admitting of the body portions 5 coming close together so as to fit snugly in the angles formed between the several blades. The body portions 5 of the clamp members or jaws are of sector shape and the several sectors when grouped together form a clamp having a body of approximately spherical form. The clamp members are suspended loosely from the hub 2. A sleeve 9 has its lower end arranged to encircle the shanks 6 of the clamp members so as to press the latter inward and effect a gripping of the blades so as to hold the parts firmly when the implement is adjusted for use. The upper end of the sleeve 9 receives a handle B, which is inserted therein. The upper portion of the stem 3 is threaded and is adapted to screw into the lower end of the handle. A nut 10 is fitted in an opening formed in the handle and receives a threaded end of the stem 3. As the stem 3 is screwed into the handle B the hub 2 at the lower end thereof is drawn into the lower end of the sleeve 9 and at the same time causes the clamp members to be forcibly advanced into the sleeve with the result that the clamp members are pressed together and are forced into the angles between the ends of the blades so as to clamp the latter to one another and to the handle.

The upper outer ends of the sector-shaped body portions 5 of the clamp members constitute in effect cam surfaces which ride upon the lower end of the sleeve 9, thereby causing the clamp members to be pressed inward so as to grip the parts in the manner stated. By loosening the handle B the sleeve 9 may be moved upward upon the shanks of the clamp members and admit of the latter releasing the cutter head, which may be detached from the clamp and the blades subsequently separated either for sharpening or for cleaning.

From the foregoing it will be understood that the construction is such that the parts may be quickly dismembered for any purpose and readily assembled when the implement is required for use.

The implement may be used for mincing food, such as meat, vegetables, fruit and the like and when it is required to lay the same aside the parts may be conveniently loosened and easily separated to admit of a thorough cleaning and drying of the several elements and the packing of the parts in a small space so that they may be safely stored until required for future use when the implement may be quickly assembled and the parts firmly secured without requiring extraneous fastening means or the use of any tools.

From the foregoing description, taken in connection with the accompanying drawing, the advantages of the construction and of the method of operation will be readily apparent to those skilled in the art to which the invention appertains.

Having thus described the invention what is claimed as new, is:—

1. In an implement of the character set forth, the combination of a plurality of intersecting blades, a clamp comprising a series of members, each member comprising a sector-shaped body and a shank, the latter having a portion near its upper end reduced to provide a neck and having a head surmounting said neck, a hub having a series of notches to receive the neck portions of said shanks, and means for confining the shanks of the clamp members in the notches of the hub and serving to compress the clamp members to grip the cutter blades.

2. A chopper comprising a cutter head embodying radially disposed blades, a clamp formed of a plurality of members, each member consisting of a sector-shaped body and a shank, the latter having a head at its upper end and a reduced portion forming a neck immediately below the head, the clamp members being arranged with their body portions entering the angles formed between the cutter blades, a hub having notches receiving the neck portions of the beforementioned clamp members, a stem connected to the hub and having its upper portion threaded, a sleeve receiving said stem and hub and the shank portions of the clamp members, and a handle fitted to said sleeve and having a screw thread connection with the stem to move the latter within said sleeve to cause the clamp members to be pressed together and clamp the cutting blades of the cutter head.

In testimony whereof I affix my signature in presence of two witnesses.

EDWARD L. ZAHN.

Witnesses:
WARREN CUNNINGHAM,
MARIE COLLINS.